R. A. HEISEL.
WOOD SAW.
APPLICATION FILED DEC. 14, 1920.

1,387,264.

Patented Aug. 9, 1921.

WITNESSES
W. G. Jones
S. W. Foster

INVENTOR
R. A. HEISEL

ATTORNEYS

UNITED STATES PATENT OFFICE.

RUDOLPH A. HEISEL, OF LUVERNE, MINNESOTA.

WOOD-SAW.

1,387,264.　　　　Specification of Letters Patent.　　Patented Aug. 9, 1921.

Application filed December 14, 1920. Serial No. 430,623.

*To all whom it may concern:*

Be it known that I, RUDOLPH A. HEISEL, a citizen of the United States, and a resident of Luverne, in the county of Rock and State of Minnesota, have invented a new and Improved Wood-Saw, of which the following is a full, clear, and exact description.

This invention relates to improvements in wood saws, and more particularly to a pole or core-wood cross-cut saw, an object of the invention being to provide improved means for transmitting motion to the saw, improved mounting for the saw frame, improved means for preventing rattling, vibration and lateral displacement of the saw frame and improved means for facilitating the movement of the saw frame during its operation.

A further object is to provide a saw of the character stated which embodies in its construction a mechanism of strength and durability as well as simplicity which is capable of adjustment and which will most efficiently perform the functions for which it is intended.

With these and other objects in view the invention consists in certain novel features of construction, and combinations and arrangements of parts as will be more fully hereinafter described and pointed out in the claims.

In the accompanying drawings—

Figure 1:
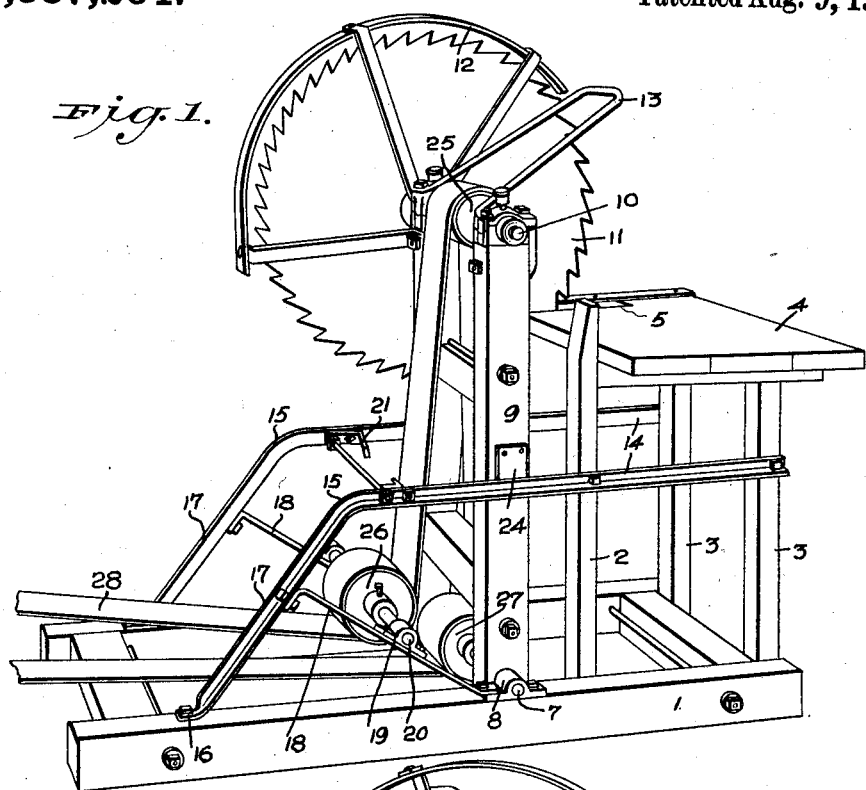
Figure 1 is a perspective view illustrating the saw in operative position.
Figure 2:
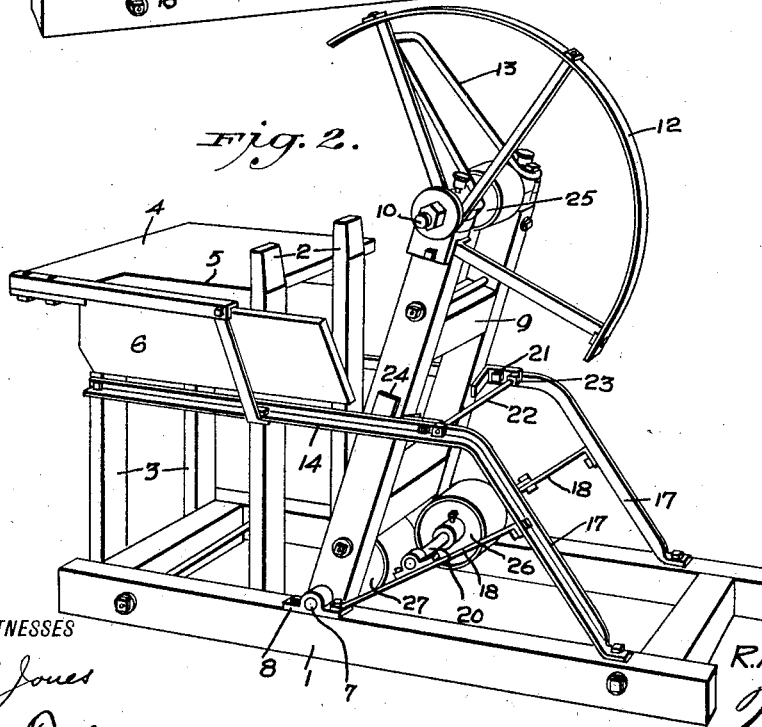
Fig. 2 is a perspective view, the saw being omitted showing the saw frame in its inoperative position.

1 represents a base frame having uprights 2 and 3 supporting a table 4, the uprights 2 at the inner end of the table extending above the table and constituting guides for the wood to be cut. This table 4 is made with a slot or recess 5 and with a deflecting board 6 as is customary in the art.

A shaft 7 is supported in suitable bearings 8 on the base frame 1 and on this shaft 7 my improved saw frame 9 is pivotally mounted at its lower end to allow an oscillation of the frame within certain limits. The free end of the frame 9 supports a shaft 10 on which a circular saw 11 is removably secured and a saw guard 12 is secured to the frame 9 to protect the operator from the teeth of the saw. A relatively long bail shaped handle 13 is secured to the upper end of the saw frame 9 and is in convenient reach of the operator located in front of the table 4 so that he can cause the movement of the frame and the saw without in any way endangering himself during the cutting operation.

14, 14, represent a pair of angle iron rails which are secured to the uprights 2 and 3 and extend rearwardly for an appreciable distance substantially parallel to the base 1 and are then bent downwardly as shown at 15, and extend downwardly and are secured to the base frame 1 as shown at 16, so that said rails while they are horizontal throughout the main portion of their lengths at one end are inclined as shown at 17. These inclined portions of the rails are connected by brace bars 18 with the bearings 8 above referred to and said brace bars 18 support bearings 19 in which a shaft 20 is located.

A stop 21 is secured to one of the rails 14 and acts as a shoulder to be engaged by the saw frame 9 and limit the movement of said frame in one direction and an adjusting rod or bolt 22 extends through the rails 14 and is adjustably held by means of nuts 23 to move the rails toward and away from each other and regulate their frictional engagement with wear plates 24 on the saw frame. In other words, these rails 14, 14, closely engage the saw frame 9, or rather the wear plates of the saw frame, and hold the saw frame against lateral movement and lateral vibration.

A pulley 25 is fixed to the shaft 10 and pulleys 26 and 27 are mounted loosely on the shafts 20 and 7 respectively, said pulleys 26 and 27 being in alinement with the longitudinal center of the saw frame and around which the runs of the endless drive belt 28 are passed to hold said belt in proper engagement with the pulley 25 and maintain the proper frictional engagement of said belt and pulley during the movement of the saw frame and particularly when the saw frame is moved forwardly for the cutting operation as the tendency is then to tighten the belt by reason of the location of the pulley.

The operation is as follows: The wood to be cut is placed on the table 4 against the upper ends of the uprights 2 and the operator grasps handle 13 and moves the saw frame 9 forwardly to cause the saw 11 to engage the wood to be cut and as the wood is severed, he manually returns the saw frame to its rearward position and again places the wood in position for cutting operation.

By reason of the location and length of the handle the saw can be conveniently operated by one hand while the wood is adjusted and held by the other hand, so that the machine can as an entirety be conveniently controlled by a single operator.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A saw of the character described, comprising a base, a table supported on the base, a saw frame pivotally mounted on the base, a pair of rails between which the saw frame is movable, and means for adjusting the rails toward and away from each other to control the frictional engagement of the rails and the saw frame.

2. A device of the character described, comprising a base, a table supported on the base, a saw frame pivotally mounted on the base, a pair of rails between which the saw frame is movable, means for adjusting the intermediate portions of the rails toward and away from each other to control the frictional engagement of the rails with the saw frame, a handle projecting forwardly from the upper end of the saw frame, a shaft at the upper end of the saw frame, a saw secured to the shaft, a pair of pulleys supported by the base frame in alinement with the longitudinal center of the saw frame, a pulley on the saw shaft, and an endless belt passed over said last-mentioned pulley and in engagement with both of the first-mentioned pulleys.

3. A device of the character described, comprising a base frame, uprights on the base frame, a table supported on the uprights, a shaft supported on the base frame, a saw frame mounted on the shaft, rails secured to the uprights and to the base frame and between which the saw frame is movable, means for adjusting the intermediate portions of the rails toward and away from each other to control the frictional engagement of the rails with the saw frame, inclined bars connecting the rails with the base frame, a shaft supported by said bars, a saw shaft at the upper end of the saw frame, a saw on the shaft, a guard on the saw frame over the saw, a bail-shaped handle projecting from the saw frame, idle pulleys loosely mounted on the first-mentioned shaft and on the shaft supported by the inclined bars, said pulleys located in alinement with the longitudinal center of the saw frame, a pulley on the saw shaft, and a belt having its runs in contact with said idle pulleys and passed over the pulley on the saw shaft.

RUDOLPH A. HEISEL.